(12) United States Patent
Zamfes

(10) Patent No.: US 7,723,614 B2
(45) Date of Patent: May 25, 2010

(54) EXPLOSION PROOF ENCLOSURE

(76) Inventor: Konstandino Zamfes, 1830 - 10^TH Avenue S.W., Calgary, Alberta (CA) T3C 0J8

( * ) Notice: Subject to any disclaimer, the term of this patent is extended or adjusted under 35 U.S.C. 154(b) by 345 days.

(21) Appl. No.: 11/949,502

(22) Filed: Dec. 3, 2007

(65) Prior Publication Data

US 2009/0008119 A1    Jan. 8, 2009

Related U.S. Application Data

(60) Provisional application No. 60/868,277, filed on Dec. 1, 2006.

(51) Int. Cl.
*H02G 3/08* (2006.01)

(52) U.S. Cl. ............... 174/50; 174/58; 174/60; 174/63; 174/64; 439/535; 248/906; 220/4.02

(58) Field of Classification Search ............ 174/50, 174/58, 60, 63, 64; 439/535; 248/906; 220/3.8, 220/4.02
See application file for complete search history.

(56) References Cited

U.S. PATENT DOCUMENTS

| | | | | |
|---|---|---|---|---|
| 3,927,249 A * | 12/1975 | Pearse | ................... | 174/51 |
| 4,664,281 A * | 5/1987 | Falk et al. | ................... | 220/3.8 |
| 5,534,664 A * | 7/1996 | Fearing et al. | ................... | 174/50 |
| 6,102,360 A * | 8/2000 | Clegg et al. | ................... | 248/27.1 |
| 6,827,230 B1 * | 12/2004 | Tuniewicz et al. | ................... | 220/3.8 |
| 6,867,364 B2 * | 3/2005 | Hafskjold et al. | ................... | 174/50 |
| 7,220,144 B1 * | 5/2007 | Elliot et al. | ................... | 439/535 |
| 7,538,270 B2 * | 5/2009 | Herth | ................... | 174/50 |

* cited by examiner

*Primary Examiner*—Dhiru R Patel
(74) *Attorney, Agent, or Firm*—Tarolli, Sundheim, Covell & Tummino LLP

(57) ABSTRACT

A method and apparatus for providing an explosion proof enclosure by providing expandable or extendible enclosure wall, side, top, or bottom sections which allow the explosion to be contained internally without the enclosure erupting or the enclosure bursting.

18 Claims, 6 Drawing Sheets

EXPLOSION PROOF ENCLOSURE

CROSS REFERENCE TO RELATED APPLICATIONS

This application claims the benefit of priority of U.S. Provisional Patent Application No. 60/868,277 filed Dec. 1, 2006, which is incorporated herein by reference in its entirety.

FIELD OF THE INVENTION

The present invention relates generally to Explosion Proof Enclosures of any size, configuration and which are classified for Hazardous locations such as those under the National Electric Code/Canadian Standards Association or the equivalent or similar codes.

BACKGROUND OF THE INVENTION

At a variety of commercial, industrial or other sites where flammable materials such as hydrocarbon vapor or grain or coal dust may enter electrical equipment, an explosion proof container, such as an explosion proof junction box, may be used to mitigate the problems associated with the ignition of such materials.

One particular example is during drilling, of a well into a subsurface formation. Mud is circulated down the hole to flow-up the drill bit cuttings. As a result the cuttings are liberated and produced hydrocarbons are flowed to the surface. When the mud and cuttings and hydrocarbons hit the shaker, the mud is cleaned from the cuttings and hydrocarbons are released at the first and the most active stage. The concentration of gas in the air may reach the range between the lower explosive limit (LEL) and the higher explosive limit (HEL), thus an explosive hazard may be created. Thus, an explosion proof enclosure is required for containing a possible explosion inside the enclosure to not let the spark or flame reach the outside environment and create a blow out (or bigger fire) or explosion hazard on the rig.

Present explosion proof enclosures are bulky, expensive, and require a long time for standards and/or regulatory approval. It is, therefore, desirable to provide an improved explosion proof enclosure.

SUMMARY OF THE INVENTION

A method and apparatus for providing an explosion proof enclosure by providing expandable or extendible enclosure wall, side, lop or bottom sections (or a combination thereof) which allow the explosion to be contained internally without erupting or the enclosure bursting or rupturing. In the event of an internal explosion, the volume of the explosion proof enclosure increases to contain the explosion without allowing the explosion to escape the explosion proof enclosure (e.g. the explosion proof enclosure does not fall nor burst).

Using deformable materials, such as stainless steel, that will expand under the internal pressure, the Pressure—Volume equilibrium is calculated for the maximum volume of gas inside the enclosure during the explosion. Utilizing the basic principal of slow burning explosive properties of Methane or heavier Hydrocarbons, the gas pressure drop per volume increase is in the 3rd power, i.e. $1/(d(P)^3)=d(V)$.

This construction will reduce cost and improve delivery schedule to make the explosion proof properties more accessible for the industry, in turn saving the environment and pollution and increasing safety.

The Concentric wave form of the walls of the Enclosure will be extended outside and this creates, a bigger volume for explosion gasses which in turn drops the pressure in power 3 per unit of volume. Using known engineering principals the complex relation of form—material properties to deformation—volume increase—pressure drop may be calculated to balance the maximum possible pressure for the particular enclosure size.

The form of the enclosure's walls is not limited to wave only and may be any other shape which allows the extending or expanding or extending to increase the volume during the explosion.

In a first aspect, the present invention provides an explosion proof enclosure comprising a plurality of wall members, sealingly connected to form an enclosure having a first enclosure volume, at least one of the plurality of wall members having a volume expansion member, the volume expansion member adapted to allow the volume of the explosion proof enclosure to increase to a second enclosure volume upon an explosion of a first enclosure volume amount of an explosive substance, wherein the explosion is contained within the enclosure. Preferably the explosion proof enclosure includes a first connector, and a second connector, the first connector and the second connector are adapted to sealingly connect the explosion proof enclosure and an electrical conductor. Preferably the volume expansion member comprising a deformable wall member. Preferably the deformable wall member comprising a plurality of concentric wave forms. Preferably, in an alternate arrangement, the deformable wail member includes a bellows.

Preferably the explosive substance is a mixture of hydrocarbon vapour and air.

In a further embodiment, the present invention provides an explosion proof enclosure having a plurality of wall members, sealingly connected to form an enclosure having a first enclosure volume, and a volume displacement member, internal to the enclosure, the volume displacement member having a seated displacement volume adapted to reduce the first enclosure volume to a net enclosure volume, the volume displacement member adapted to allow the displacement volume to decrease upon an explosion of a net enclosure volume of an explosive substance, wherein the explosion is contained within the enclosure.

Preferably the volume displacement member adapted to burst when subjected to the explosion pressure. Preferably the volume displacement member includes a plurality of substantially hollow objects. Preferably the substantially hollow objects include spheres.

In a further aspect, the present invention provides a method of providing an explosion proof enclosure for a hazardous environment with an explosive substance, including selecting a first enclosure volume, within a design of a plurality of wall members, sealingly connected, determining an explosion pressure which would be generated upon the explosion of the explosive substance in the amount of the first enclosure volume, determining a second enclosure volume, the second enclosure volume being sufficiently large that the explosion pressure is reduced such that the design of the plurality of wall members contains the explosion within the enclosure, and providing a volume expansion member, the volume expansion member-adapted to allow the volume of the explosion proof enclosure to increase from the first enclosure volume to the second enclosure volume.

Preferably the first explosive vapour has a higher explosive limit, the second enclosure volume being based on the higher explosive limit. Preferably the second enclosure volume includes a safety factor. Preferably the second enclosure volume is determined by experimental testing. Preferably the safety factor is determined by experimental testing. Preferably the safety factor is percentage of the first enclosure volume. Preferably the safety factor is a percentage of the first pressure. Preferably the explosive substance comprise a mixture of hydrocarbon vapour and air.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 6a-8c is a simplified schematic of an explosion proof enclosure of the present invention;

DETAILED DESCRIPTION

Generally, the present invention provides a method and apparatus for containing an explosion inside an enclosure, by expanding to deal with the pressure generated by the explosion.

Figure 1:
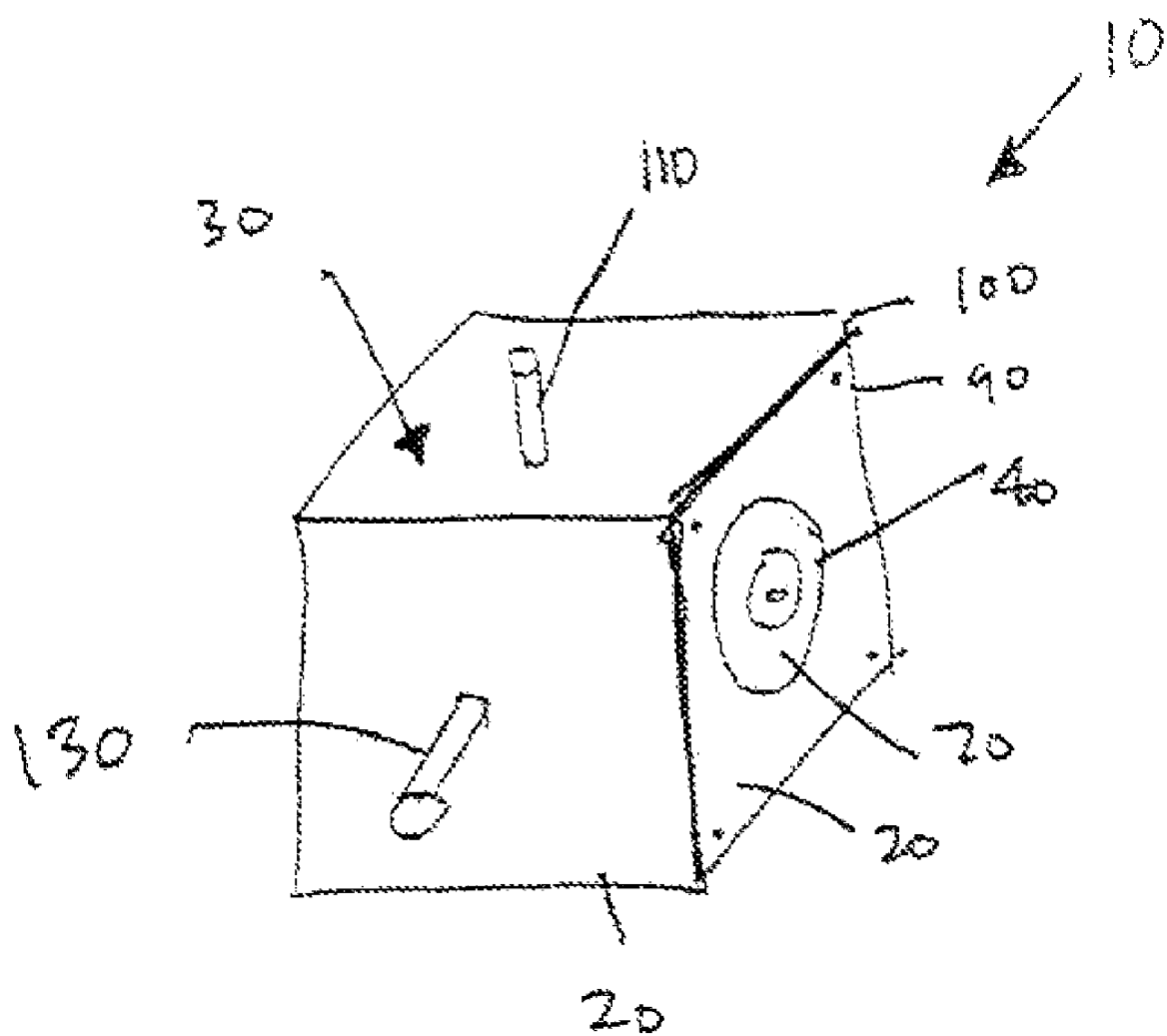
FIG. 1 is a simplified perspective view of an explosion proof enclosure of the present invention.

Referring to FIG. 1, an explosion proof enclosure 10 of the present invention includes a number of wail members 20, sealingly connected to form the enclosure 10. The enclosure 10 has a first enclosure volume 30, being the normal internal volume before any damaging explosion. At least one of the wall members 20 includes a volume expansion member 40, the volume expansion member 40 adapted to allow the volume of the enclosure 10 to increase upon the explosion of an explosive substance 50 (such as a flammable or explosive vapour or dust or mixtures of such with air or oxygen). The volume expansion member 40 allows the volume of the enclosure 10 to increase from the first enclosure volume 30 to a second enclosure volume 80.

As shown, the volume expansion member 40 comprises a deformable wall member 70 in the form of a plurality of concentric wave forms 80. As shown, the deformable wall member 70 is only one wail member 20. However, such a deformable wall member may be applied to one or more additional wall members 20. While shown as a planar box, other shapes may be uses such as a cylinder, sphere of otherwise. The deformable wall member 70 may be replaceable, for example attached with fasteners 90. A seal, such as a gasket 100 may be used to seal the enclosure 10.

A first connector 110 provides access and attachment between a first electrical conductor 120 and the enclosure 10. A second connector 130 provides access and attachment between a second electrical conductor 140 and the enclosure 10. Additional connectors may be provided. Additional conductors may be provided. In a junction box embodiment, a junction is formed: between the first electrical conductor 120 and the second electrical conductor 140 within the enclosure 10. Other applications and uses for the enclosure 10 are known to one skilled in the art.

Figure 2:
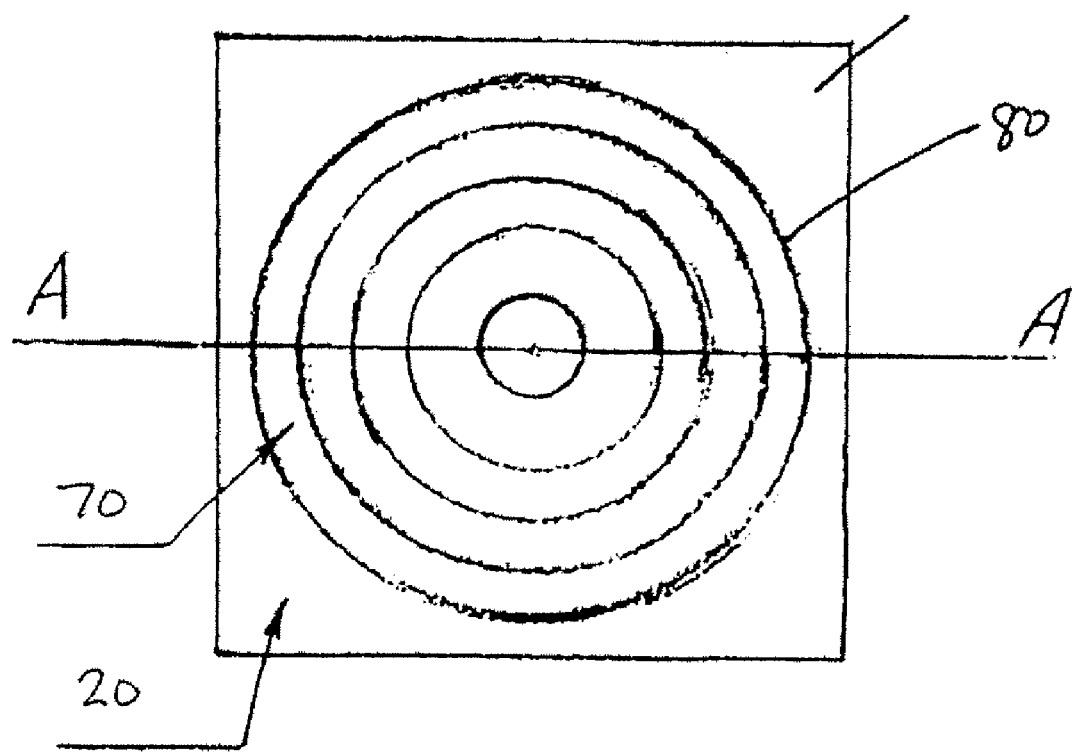
FIG. 2 is a detailed expandable wail member of the present invention.

Referring to FIG. 2, the deformable wall member 70 includes a plurality of concentric wave forms 80. The wall member 20 may include a portion of the wall having a fiat, substantially rigid portion, and a deformable wail member 70.

Figure 3:
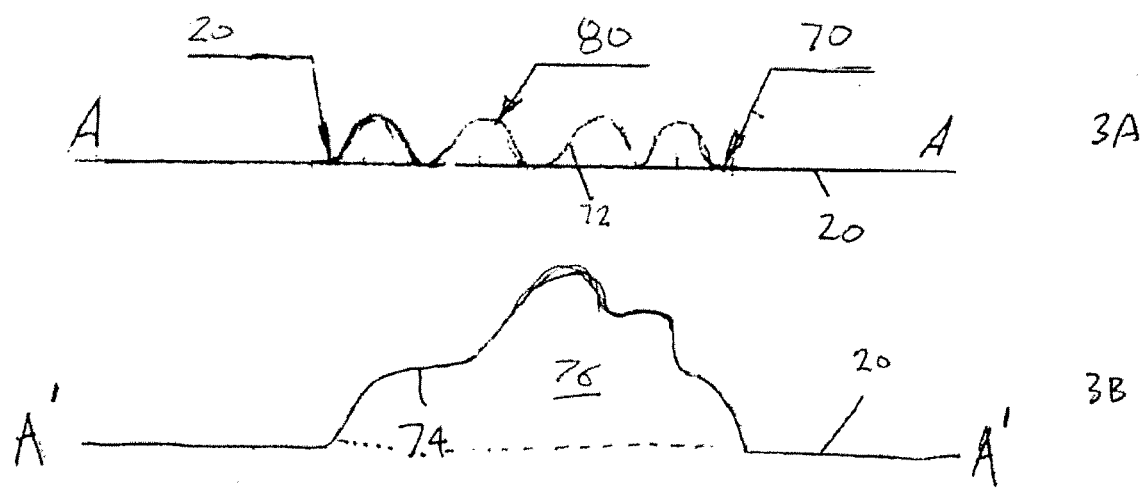
FIGS. 3a-b is the expandable wall member of FIG. 2, along section A-A, in an expandable position and an expanded position respectively.

Referring to FIG. 3a, the cross section of the expandable wall member 70 of the enclosure 10, is shown in an expandable position 72, the enclosure 10 having a first enclosure volume 30, before explosion.

Referring to FIG. 3b, the cross section of the expandable wail member 70 of the enclosure 10 is shown in an expanded position 74, the enclosure 10 having a second enclosure volume 60, during and after explosion. The expansion of the expandable wall member 70 from the expandable position 72 to the expanded position 74 has added an expansion volume 78 to the first enclosure volume, thereby reducing the maximum pressure for which the enclosure 10 must be designed to accommodate in case of an explosion.

Other examples of expandable wall members or pressure absorbing wails may include a flat wave, bellows form of box with striate thin walls from outside, an internal flat balloon, or internal plastic bails easily ruptured.

The expanding volume allows the enclosure to contain the explosion internally without erupting or bursting or substantially breaching the enclosure seal thus preventing the explosion inside the enclosure to travel outside the enclosure to potentially ignite or cause a blow out disaster on the drilling rig or site. After explosion proof enclosure encountering an explosion event, the explosion proof enclosure 10 must be replaced or the expandable wall member 70 may be replaced.

The flat portion of the wail member 70 may be attached to the next similarly constructed wall thus creating the form of the enclosure. Preferably, the front and back sides are generally flat to provide a surface for a window, indicators and/or inlets/outlets.

The wave length and amplitude may be selected from the deformation properties of the material and the size (e.g. volume/shape/etc.) of the enclosure 10. The size of the enclosure is the maximum volume of potentially explosive mixture contained within the first enclosure volume 30 at the time of explosion. The determination is based on the most expansive or extensive explosion that the explosion proof enclosure may be subjected to be encountered at site.

The wave length extendibility/expandability is the full length of the waif: $L=p \times D \times N$, where the full length L is the length of the wall; D is the length of wave, $p \times D$ is the length of one wave, and N is the number of waves.

The straight length of the enclosure wall is; $Lw=D \times N$.

The extendibility/expandability length is the volume of the cone extended to the cone perimeter equal to: $Le=L-Lw$, where Le is the extendibility of the wall in linear units.

The calculations may be performed by one skilled in the art for various explosive substances 50 such as gas (vapour) or dust or mixtures of gas or dust with air or oxygen and various enclosure sizes. The complexities introduced by adding fasteners, such as bolts, screws, etc. to hold the cover or assemble the explosion proof enclosure may also be calculated by one skilled in the art. The coordinates of spark and explosion epicenter is random and can significantly offset the precision of calculations. Practical—experimental testing, for example, inside a pressure vessel or other containment means may be used to verify the limits of an enclosure.

The pressure drop per volume increase is a function in the 3rd power: $1/(d(P)^3)=d(V)$, where dP is pressure differential change per unit of volume change dV.

Figure 4:
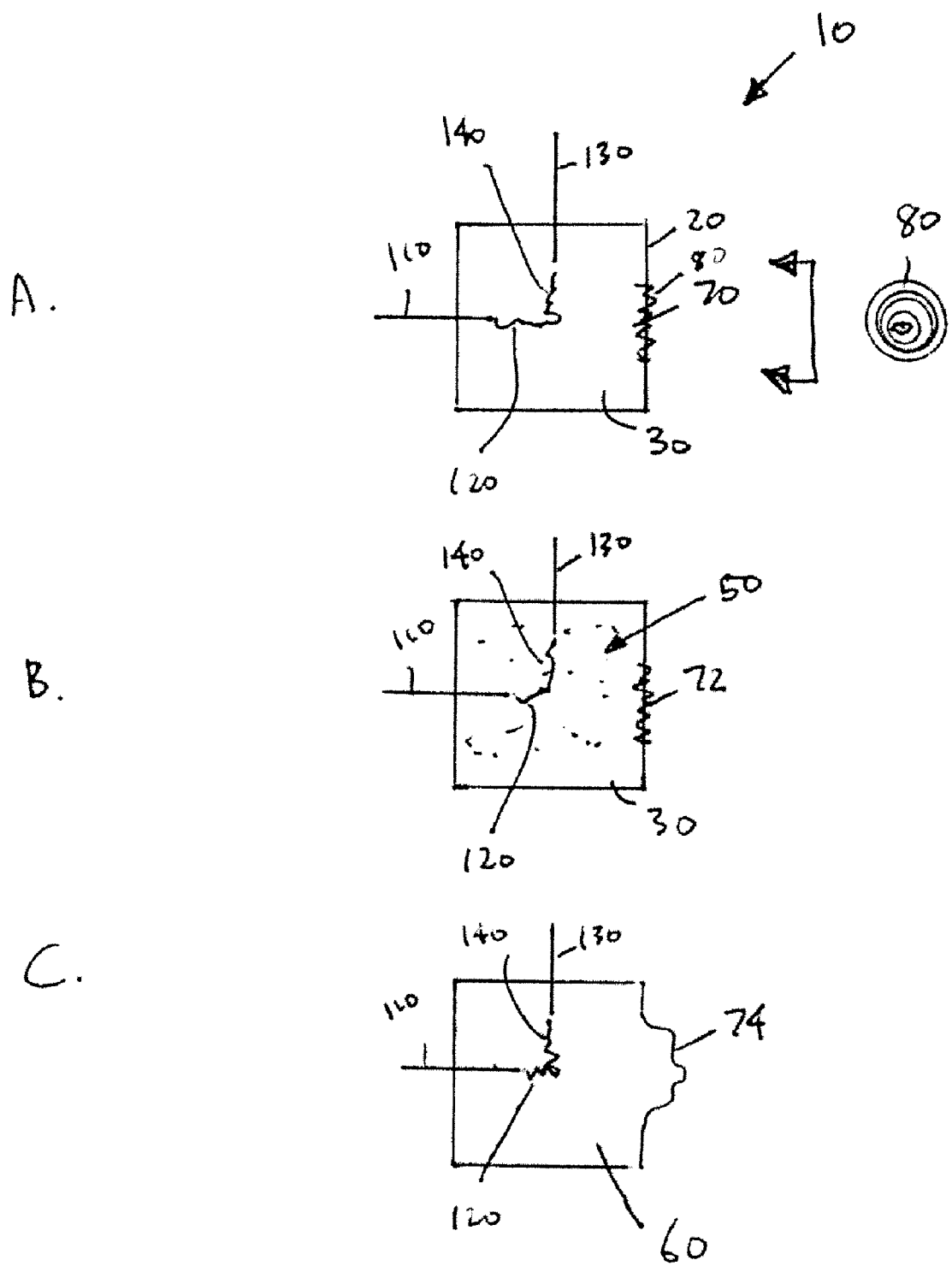
FIGS. 4a-4c is a simplified schematic of an explosion proof enclosure of the present invention.

Referring to FIGS. 4a-4c, the enclosure 10, having a first enclosure volume 30 is, generally by accident or other unintentional occurrence, allowed to contain an explosive substance 50. The enclosure 10 may include as much as the first enclosure volume 30 of the explosive substance 50. Upon the accidental sparking of the electrical connection or other trigger, an explosion of the explosive substance is triggered, generating an explosion pressure within the enclosure 10. The expandable wail member 70 expands under pressure to increase the volume of the enclosure 10 to the second enclosure volume, to reduce the pressure which the wall members 20 of the enclosure 10 must withstand. The explosion is contained within the enclosure 10.

Figure 5:
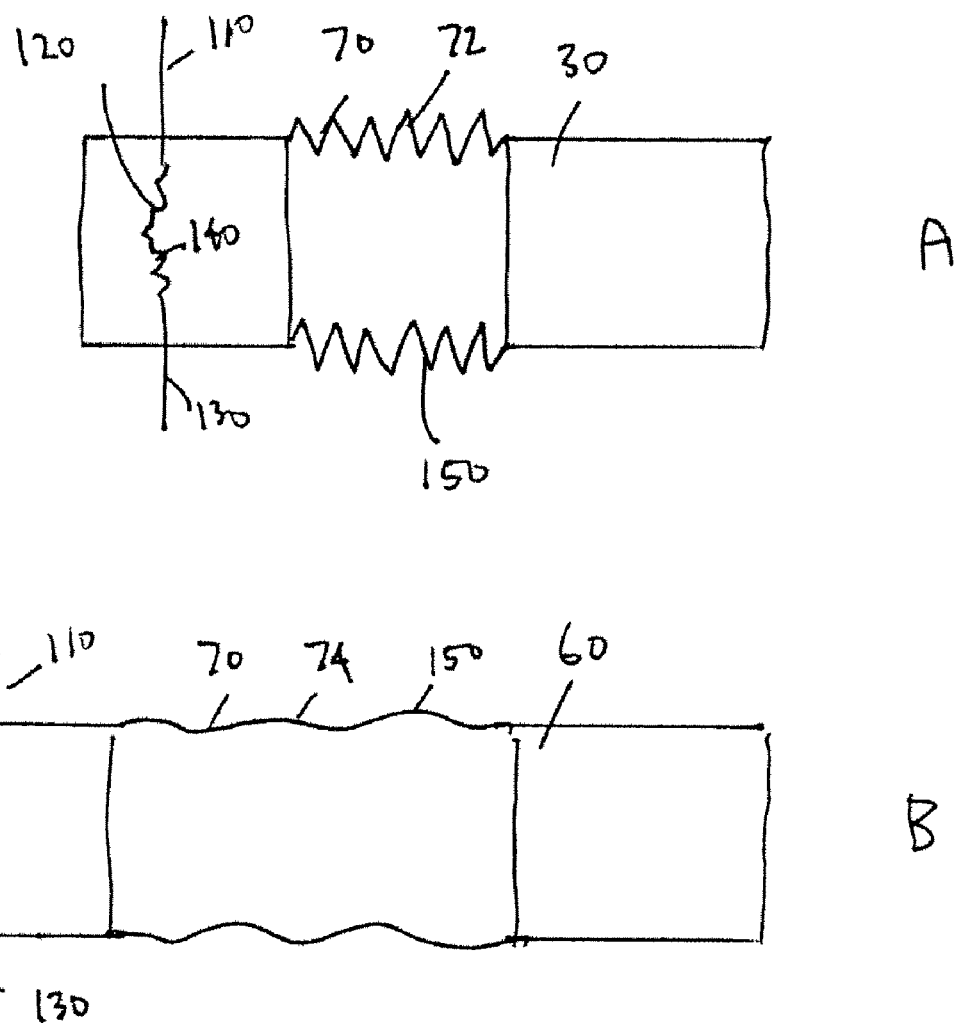
FIGS. 5a-5b is a simplified schematic of an explosion proof enclosure of the present invention.

Referring to FIGS. 5a-5b, the enclosure 10 includes an expandable wail member 70 in the form of bellows 150. The enclosure 10, having a first enclosure volume 30 is, generally by accident or other unintentional occurrence, allowed to contain an explosive substance 50. The enclosure 10 may include as much as the first enclosure volume 30 of the explosive substance 50. Upon the accidental sparking of the electrical connection or other trigger, an explosion of the explosive substance is triggered, generating an explosion pressure within the enclosure 10. The expandable wall member 70 in the form of bellows 150 expands under pressure to increase the volume of the enclosure 10 to the second enclosure volume 60, to reduce the pressure which the wall members 20 of the enclosure 10 must withstand. The explosion is contained within the enclosure 10.

Figure 6:
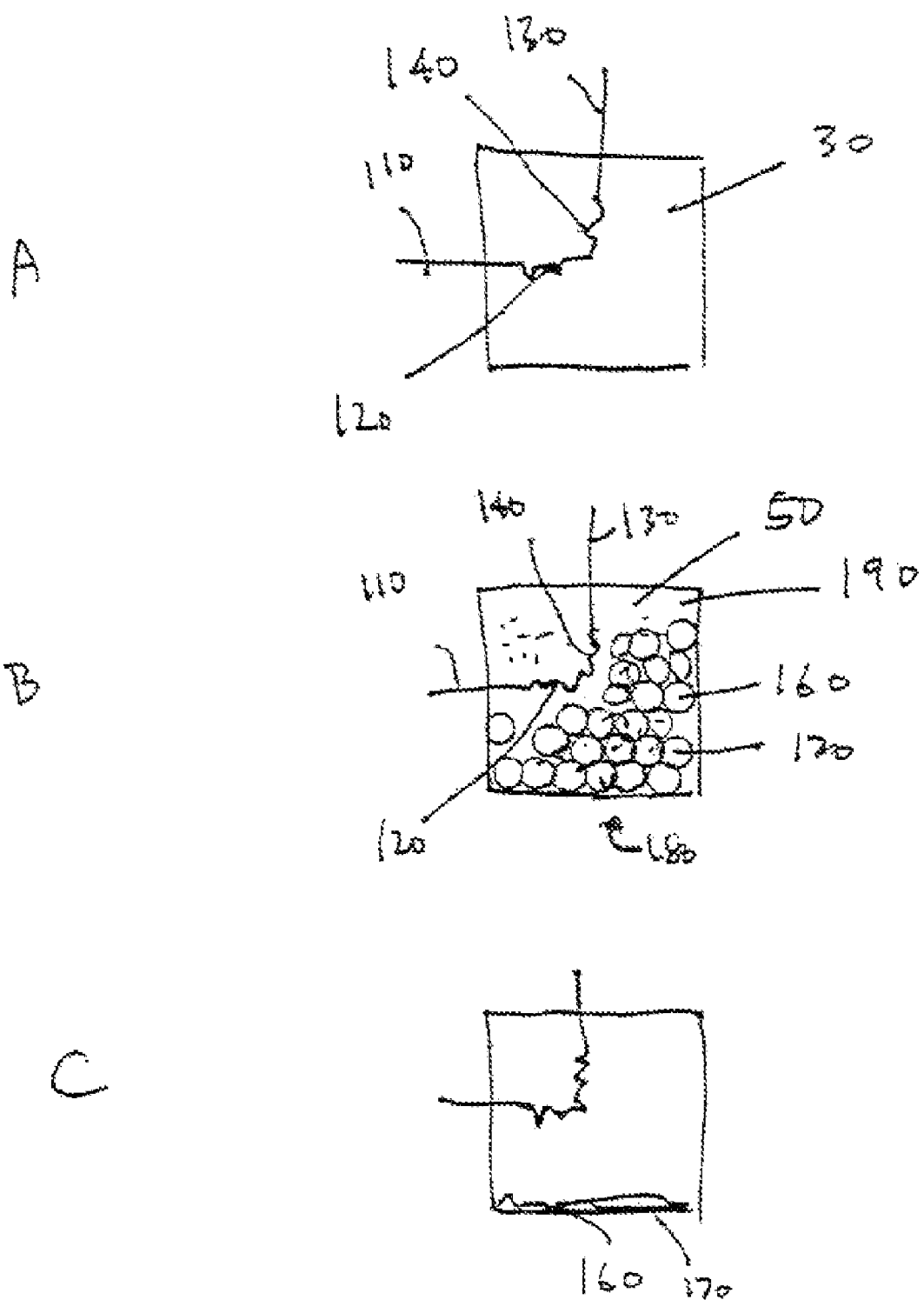

Referring to FIGS. 6a-6c, the enclosure 10, having a first enclosure volume 30, has a volume displacement member 180, shown as hollow spheres 170 which are sealed. The amount of space available for the explosive substance 50 is therefore reduced from the first enclosure volume 30 by a sealed displacement volume 180 (being the total volume of the hollow spheres 170) to a net enclosure volume 190. The enclosure 10 may include as much as the net enclosure volume 180 of the explosive substance 50. Upon the accidental sparking of the electrical connection or other trigger, an explosion of the explosive substance is triggered, generating an explosion pressure within the enclosure 10. The hollow spheres 170 are crushed or burst to increase the volume of the enclosure 10 from the net enclosure volume 190. Preferably the volume is increased substantially to the first enclosure volume 30 to absorb the pressure which the wall members 20 of the enclosure 10 must withstand. The explosion is contained within the enclosure 10.

In the preceding description, for purposes of explanation, numerous details are set forth in order to provide a thorough understanding of the embodiments of the invention. However, it will be apparent to one skilled in the art that these specific details are not required in order to practice the invention.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. An explosion proof enclosure comprising a plurality of wall members, sealingly connected to form an enclosure having a first enclosure volume, at least one of the plurality of wall members having a volume expansion member, the volume expansion member adapted to allow the volume of the explosion proof enclosure to increase to a second enclosure volume upon an explosion of a first enclosure volume amount of an explosive substance, wherein the explosion is contained within the enclosure.

2. The explosion proof enclosure of claim 1, further comprising a first connector, and a second connector, the first connector and the second connector adapted to sealingly connect the explosion proof enclosure and an electrical conductor.

3. The explosion proof enclosure of claim 1, the volume expansion member comprising a deformable wall member.

4. The explosion proof enclosure of claim 3, the deformable wall member comprising a plurality of concentric wave forms.

5. The explosion proof enclosure of claim 3, the deformable wall member comprising a bellows.

6. The explosion proof enclosure of claim 1, wherein the explosive substance is a mixture of hydrocarbon vapour and air.

7. An explosion proof enclosure comprising:
   a. a plurality of wall members, sealingly connected to form an enclosure having a first enclosure volume; and
   b. a hollow volume displacement member, internal to the enclosure, the volume displacement member having a sealed displacement volume adapted to reduce the first enclosure volume to a net enclosure volume, the volume sealed displacement member adapted to allow the displacement volume to decrease upon an explosion of the net enclosure volume of an explosive substance, wherein the explosion is contained within the enclosure.

8. The explosion proof enclosure of claim 7, the volume displacement member adapted to burst when subjected to the explosion pressure.

9. The explosion proof enclosure of claim 7, the volume displacement member comprising a plurality of substantially hollow objects.

10. The explosion proof enclosure of claim 9, the substantially hollow objects comprising spheres.

11. A method of providing an explosion proof enclosure for a hazardous environment with an explosive substance, comprising:
    a. selecting a first enclosure volume, within a design of a plurality of wall members, sealingly connected;
    b. determining an explosion pressure which would be generated upon the explosion of the explosive substance in the amount of the first enclosure volume;
    c. determining a second enclosure volume, the second enclosure volume being sufficiently large that the explosion pressure is reduced such that the design of the plurality of wall members contains the explosion within the enclosure; and
    d. providing a volume expansion member, the volume expansion member adapted to allow the volume of the explosion proof enclosure to increase from the first enclosure volume to the second enclosure volume.

12. The method of claim 11, wherein the first explosive vapour has a higher explosive limit, the second enclosure volume being based on the higher explosive limit.

13. The method of claim 11, wherein the second enclosure volume includes a safety factor.

14. The method of claim 13, wherein the safety factor is determined by experimental testing.

15. The method of claim 13, wherein the safety factor is percentage of the first enclosure volume.

16. The method of claim 13, wherein the safety factor is a percentage of the first pressure.

17. The method of claim 11, wherein the second enclosure volume is determined by experimental testing.

18. The method of claim 11, wherein the explosive substance comprise a mixture of hydrocarbon vapour and air.

* * * * *